United States Patent Office 3,132,875
Patented May 12, 1964

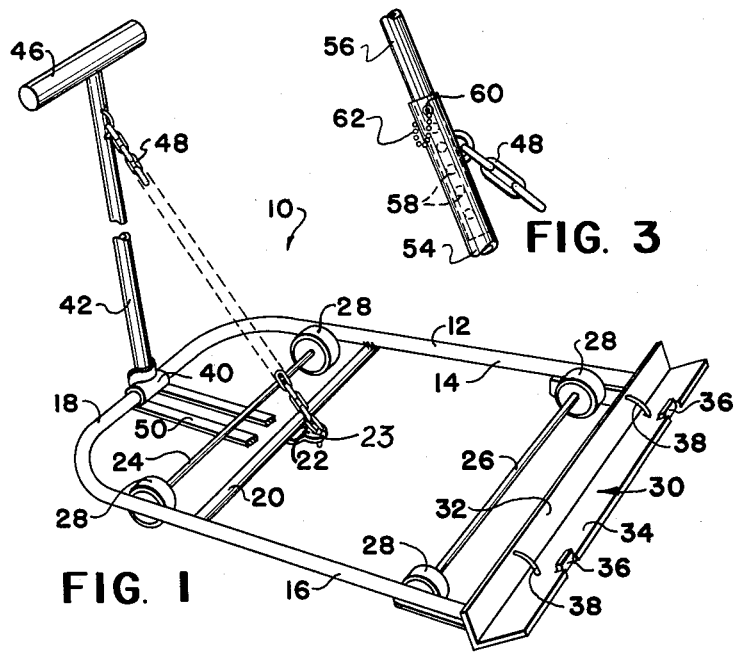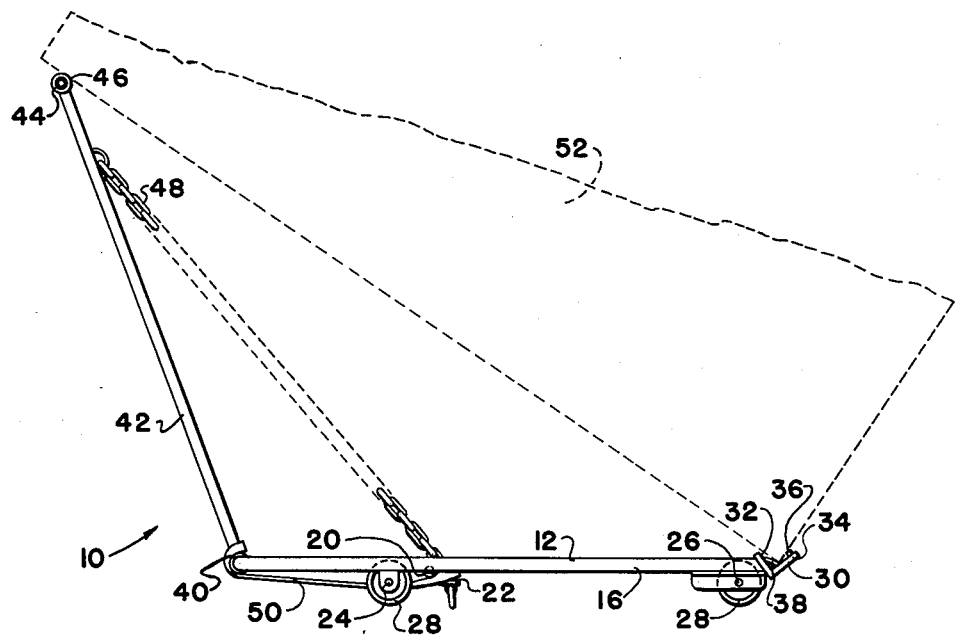

3,132,875
APPLIANCE TRANSPORTING DOLLY
Percy V. Plumly, Halstead, Kans.
Filed June 28, 1961, Ser. No. 126,793
3 Claims. (Cl. 280—47.34)

This invention relates to carrying means, and in a more particular aspect to a dolly constructed and adapted to carry relatively large, bulky articles such as automatic washers, dryers and the like.

Various types of dollies or carrier means are known to the prior art. Many of the prior art devices are directed toward specialized constructions which are suitable for receiving and carrying only a particular article or articles and are not adjustable for other purposes. Where relatively heavy articles are to be moved, most dollies require the use of power lifting means. While power assisted dollies can be used in factory operations or in relatively large shops, offices and the like, such are undesirable for repairman or the like due to the cost involved and difficulty in transporting same to each job or operation. This is particularly true where articles such as washers, dryers and the like are installed or moved by individual repairman.

In accordance with the present invention a dolly has been provided which overcomes the deficiencies of the prior art and is particularly constructed for use with appliances such as washers, dryers, and the like. The dolly of the present invention is light enough to be carried to the work area and is versatile so as to be used with a number of different appliances. The present invention can be easily constructed and is light and inexpensive, making it suitable for use by individuals in the repair business.

The dolly of the invention includes frame means which are preferably mounted on wheel means to support the frame means. Suitable means are provided with the frame means to receive and support a load thereon, desirably in a tilted position.

In a preferred specific embodiment of the invention the dolly comprises a U-shaped frame member mounted on wheel means for easy movement. An angle iron or the like is provided at one end of the frame means to receive the edge of the appliance thereon and an upwardly projecting post and handle at the other end of the frame means is positioned to receive an intermediate portion of the appliance to support same in tilted position during movement. Means can be provided to position and support the post which is desirably constructed to be folded onto the frame means during periods of non-use.

Accordingly, it is an object of the invention to provide a new dolly.

Another object of the invention is to provide a dolly constructed to receive and retain thereon for movement an appliance or the like.

Another object of the invention is to provide a new dolly which is relatively light in weight and inexpensive to construct.

A further object of the invention is to provide a new dolly particularly constructed and adapted for moving appliances such as automatic washers, dryers and the like.

A further object of the invention is to provide a dolly which can be collapsed for periods of non-use or when carrying the dolly from job to job.

Various other objects, advantages and features of the invention will become apparent to those skilled in the art from the following description taken in connection with the accompanying drawings, in which:

FIG. 1 is an isometric view, partially broken away, showing a preferred specific embodiment of the dolly of the invention.

FIG. 2 is an enlarged side elevation view of the embodiment of the invention as shown in FIG. 1.

FIG. 3 is an enlarged partial side elevation view illustrating an embodiment of the invention.

The following is a discussion and description of preferred specific embodiments of the new dolly of the invention, such being made with reference to the drawings whereon the same reference numerals are used to indicate the same or similar parts and/or structure. It is to be understood that such discussion and description is not to unduly limit the scope of the invention.

Referring now to the drawings in detail, a preferred specific embodiment of the dolly of the invention is shown generally at 10 and includes an elongated generally U-shaped frame member 12 having spaced and generally parallel side portions 14 and 16 joined at one end by a curved portion 18. Portion 18 of frame 12 can be integrally formed, as shown, or separately formed and secured to side portions 14 and 16 by welding, etc. Suitable transverse support means 20 can be provided, if desired, and such as shown as being in the closed end portion of the frame means 12. A bracket 22 can be provided and secured to the center portion of support member 20. The bracket 22 is preferably provided with a notch 23 with the closed end of the bracket being secured to the support 20 and with the open end of the notch facing toward the open end of the frame.

Two spaced axles 24 and 26 are mounted on the side portions 14 and 16 of the frame means 12 and are preferably spaced from the ends of the frame means as shown in the drawings. Depending flanges or ears can be secured to the frame to mount the axles. Four wheels 28 are rotatably mounted on the end portions of axles 24 and 26.

Means are preferably provided at one end portion of the frame 12 to receive and retain thereon an edge of an article to be moved. In the preferred embodiment shown in the drawings such is provided by an angle iron 30 which has one side portion 32 secured to the end portions of the side members 14 and 16 of the frame 12 in any suitable manner, such as by welding or the like. The angle iron 30 is preferably mounted so that the other side portion 34 of the angle iron 30 projects outwardly and upwardly from the side 32 as shown in the drawings. If desired, spaced abutments as shown at 36 can be integrally formed with the side portion 34 to project upwardly from the side portion and form stops which prevent any sliding movement of the article mounted thereon. In some instances, such as where relatively heavy articles are being moved, the angle iron 30 can be reinforced by suitable brace members 38 which are secured in their end portions to the portions 32 and 34 of the angle iron.

A collar 40 is preferably provided and is centrally and rotatably mounted on the closed end portion 18 of the frame means 12. Collar 40 is rotatable on the frame means and has secured thereto a post 42 to turn therewith. A handle 44 can be provided and secured to the other end portion of post 42 and desirably extends transversely thereto as shown in the drawings. Handle 44 can be covered with a suitable resilient material 46, such as rubber, rubber-like materials, plastics, etc. The cover 46 prevents damage or scratching to the article being carried.

Means are preferably provided to position the post 42 and handle 44 in the desired upright position when supporting an article thereon. A preferred means of accomplishing this is shown in the drawings and includes a chain 48 which is secured in one end portion to an intermediate portion of the post 42 and the other end portion of the chain 48 is secured by placing one link within the slot of the bracket 22 with the adjacent links engaging the bracket to hold the chain in place. By using a flexible connecting member, such as the chain 48, the handle 42 can be lowered over the support 20 and axle 24 and 26 during periods of non-use, and the handle 44 and cover 46 thereon can be positioned so as to abut or be adjacent to the side portion 32 of the angle iron 30 thus making a relatively compact unit which is easily shipped or carried.

Suitable means can be provided to retain the chain 48 in position in the bracket 22. In the preferred embodiment shown in the drawings this is accomplished by providing an endless resilient band 50 which is positioned against the chain 48 immediately above bracket 22, and extends beneath the support 20 and the frame means 12 and passes around and engages the lower end portion of the post 42. The band 50, when stretched in position as shown, will also exert a force on the post 42 and help maintain same in an upright position.

In use, the portion 34 of the angle iron 30 is positioned beneath the edge of an appliance 52 or the like, such as an automatic washer, dryer, etc., and the appliance is then tilted to be positioned across the dolly with an intermediate portion thereof engaging and supported by the handle 44 and post 42. Post 42 can, of course, be adjusted rearwardly or forwardly relative to the appliance 52 so that the appliance is properly balanced thereon and will normally need or require no effort or force by the user in order to retain the appliance in position. It is then only necessary to push the dolly 10 or the appliance 52 in order to move the entire device. The dolly can, of course, be made in various sizes so that articles of various dimensions and shapes can easily be received and carried by the dolly.

The dolly of the invention can be made even more versatile and suitable for additional applications by modifying the post construction in the manner illustrated in FIG. 3 of the drawings. In this embodiment the post is constructed of two separate tubular members 54 and 56, the member 54 being secured to the collar 40 or directly to the frame means and telescopically receiving therein at the upper end portion thereof the member 56. One of the members 54 and 56, such as the member 56, is provided with a plurality of apertures 58 in longitudinally spaced relation. The tubular member 54 is provided with a single aperture near the upper end portion thereof which receives a pin 60, the pin 60 also passing through one of the apertures 58 to adjustably position the member 56 therein. Connecting means 62, such as a chain, rope, etc., are preferably provided and secured in the end portions to the pin 60 and to the exterior surface of the member 54 so that the pin will not be lost in use. The handle 46 is, of course, secured to the upper end portion of the member 56 (not shown). By providing an adjustable post the dolly can receive various sizes and types of equipment or appliances. Such adjustment is desirable since in many instances doors on the front of washers, dryers and the like may be engaged by a stationary handle 44 and such engagement is undesirable and could cause injury to the appliance, etc. being carried.

The frame members, posts, etc. can be constructed from any suitable materials, such as aluminum, steel, alloys of same, etc. and such can be of any desired construction or shape. The post, handle, frame, etc. can be made from tubular members to reduce the overall weight.

While the invention has been described in connection with preferred specific embodiments thereof, it will be understood that this description is intended to illustrate and not to limit the scope of the invention, which is defined by the claims.

What is claimed as new is:

1. A dolly for washers, dryers and the like comprising, in combination, an elongated U-shaped frame member, a transverse support secured to said frame member in the closed end portion thereof, a bracket having a notch and secured to said support with the closed end of said notch toward said closed end portion of said frame member, two spaced axles transversely mounted on said frame member and spaced from the ends thereof, four wheels, each end portion of each of said axles rotatably receiving one of said wheels, an elongated angle iron having one of the portions forming the angle rigidly secured to the outer end of said frame member with the other portion of said angle iron projecting outwardly and upwardly, two spaced abutments formed integrally with said other portion of said angle iron and projecting upwardly to form stops, a collar centrally and rotatably mounted on said closed end of said frame member, a post rigidly secured in one end portion to said collar, a handle secured to the other end portion of said post, a chain secured in one end portion to an intermediate portion of said post and having the other end portion adjustably mounted in said notch in said bracket, and an endless resilient band mounted on said bracket to retain said chain in position thereon with said band passing beneath said support and said frame member and engaging said one end portion of said post and urging same into a position to tighten said chain, said dolly being constructed and adapted to receive and carry an automatic washer or the like with one end of said washer resting on said angle iron and held thereon by said abutments and an intermediate portion of said washer resting on said handle.

2. The dolly as defined in claim 1 wherein said post is constructed of two tubular members, the lower one of said members being secured in one end portion to said collar and having an aperture therethrough in the other end portion, the other of said tubular members being telescopically received in the first of said tubular members and having a plurality of apertures therein in longitudinal spaced relation, a pin positionable in said apertures to adjustably secure said tubular members together, and a chain connecting said pin to said lower one of said tubular members.

3. A dolly for washers, dryers and the like, comprising, in combination, an elongated frame member having spaced side portions connected at one end portion by a cross frame member, a support secured to said side members intermediate the ends thereof, a bracket mounted on said support, said bracket having an opening therein, axles mounted on said frame means, wheels mounted on said axles, an angle iron secured in its end portion to the outer end portions of said side members of said frame member, a post pivotally mounted on said cross frame member, a handle secured to said post, chain means connected in its end portions to said post and said bracket respectively, and resilient means mounted on said bracket to retain said chain means thereon with said resilient means passing beneath said frame member and engaging said post to urge same in a position to tighten said chain, said dolly being constructed and adapted to receive and carry an automatic washer or the like with one edge of said washer being positioned on said angle iron and an intermediate portion of said washer resting on said handle.

References Cited in the file of this patent

UNITED STATES PATENTS

| | | |
|---|---|---|
| 220,721 | Meinecke | Oct. 21, 1879 |
| 1,501,609 | Linden | July 15, 1924 |
| 2,253,764 | Condon | Aug. 26, 1941 |
| 2,846,233 | Burg | Aug. 5, 1958 |

FOREIGN PATENTS

| | | |
|---|---|---|
| 186,986 | Great Britain | Oct. 6, 1922 |